United States Patent
Yamaguchi

(10) Patent No.: US 6,600,148 B2
(45) Date of Patent: Jul. 29, 2003

(54) POLARIZATION MODE DISPERSION MEASURING METHOD AND POLARIZATION MODE DISPERSION MEASURING SYSTEM

(75) Inventor: Shirou Yamaguchi, Ebina (JP)

(73) Assignee: Anritsu Corporation, Tokyo (JP)

( * ) Notice: Subject to any disclaimer, the term of this patent is extended or adjusted under 35 U.S.C. 154(b) by 93 days.

(21) Appl. No.: 10/009,753

(22) PCT Filed: Mar. 13, 2001

(86) PCT No.: PCT/JP01/01976

§ 371 (c)(1), (2), (4) Date: Oct. 23, 2001

(87) PCT Pub. No.: WO01/69196

PCT Pub. Date: Sep. 20, 2001

(65) Prior Publication Data

US 2002/0158189 A1 Oct. 31, 2002

(30) Foreign Application Priority Data

Mar. 14, 2000 (JP) ......................................... 2000-070208

(51) Int. Cl.⁷ .............................. G02F 1/01; H01J 40/14
(52) U.S. Cl. ......................... 250/225; 250/216; 359/484
(58) Field of Search ................................ 250/225, 216; 359/484, 483, 497, 495, 496, 498, 337.2; 385/11, 24, 123; 372/6, 12, 700

(56) References Cited

U.S. PATENT DOCUMENTS 5,602,673 A * 2/1997 Swan .......................... 359/281
6,081,367 A * 6/2000 Yokoyama et al. ......... 359/337.2
6,282,333 B1 * 8/2001 Dultz et al. .................... 385/11

FOREIGN PATENT DOCUMENTS

JP 63243728 A * 10/1988 .............. G01J/4/00
JP 2000241760 A * 9/2000 ........... G02B/27/28

* cited by examiner

Primary Examiner—Kevin Pyo
Assistant Examiner—Seung C. Sohn
(74) Attorney, Agent, or Firm—Frishauf, Holtz, Goodman & Chick, P.C.

(57) ABSTRACT

According to the present invention, in a simple structure using a fixed analyzer method, in order to measure a smaller PMD value, a predetermined polarization mode dispersion is applied by a reference object to a linearly polarized beam extracted by a first polarizer from a broad band light emitted from a broad band light source. The polarization plane of the light applied with this predetermined polarization mode dispersion is rotated by a polarization plane rotor, and the spectrum of the linearly polarized beam extracted by a second polarizer from the light emitted from the other end side of the measured object is analyzed, thereby to obtain at least one of a maximum value and a minimum value of the polarization mode dispersion. A value based on a difference between the maximum value and the minimum value of the polarization mode dispersion, or a difference between the maximum value and the predetermined polarization mode dispersion value of the reference object, or a difference between the minimum value and the predetermined polarization mode dispersion value of the reference object, is calculated as a value of the polarization mode dispersion of the measured object.

9 Claims, 5 Drawing Sheets

POLARIZATION MODE DISPERSION MEASURING METHOD AND POLARIZATION MODE DISPERSION MEASURING SYSTEM

This application is a U.S. National Phase Application under 35 USC 371 of International Application PCT/JP01/01976 (not published in English) filed Mar. 13, 2001.

TECHNICAL FIELD

The present invention relates to a polarization mode dispersion measuring method and a polarization mode dispersion measuring system, and relates, particularly, to a polarization mode dispersion measuring method and a polarization mode dispersion measuring system employing a technique for measuring in high precision the polarization mode dispersion of an optical device as a measured object.

BACKGROUND ART

As known, among optical devices, refractive indexes of an optical fiber, for example, vary depending on the direction of polarization.

Because of differences in refractive indexes due to this difference in polarization direction, a group delay time difference occurs in the polarization directions of light transmitted by this optical fiber.

As a result, there occurs a phenomenon that when an optical pulse or the like is incident to an input end of the optical fiber, the width of the optical pulse is expanded at an output end.

This phenomenon is called "polarization mode dispersion" (PMD), and, in a long-distance and high-speed optical transmission system, this is an important factor determining the performance of this system.

Particularly, in the case of carrying out an optical transmission of 1.55 $\mu$m by using a 1.3 $\mu$m zero-dispersion optical fiber, in mainstream use throughout the world at present, or in a wavelength-multiplexed system and a high-speed transmission (Gbit/s order) long-distance optical submarine cable system that use an optical amplifier, this polarization mode dispersion (PMD) becomes a big problem, and extremely limits the propagation distance.

Therefore, in the case of designing an optical transmission system or the like, it is necessary to measure in advance a level of the polarization mode dispersion (PMD) of optical devices including an optical fiber that are used in this system.

As a method for measuring this polarization mode dispersion (PMD), a fixed analyzer method that has a characteristic of high measuring precision while having a simple structure has been widely used among an interference method in a time region, the fixed analyzer method in a frequency region, and a polarization analysis method that have been conventionally known.

FIG. 6 shows a conventional measuring system for measuring a polarization mode dispersion by using this fixed analyzer method.

According to this measuring system, after a linearly polarized beam in a specific polarization direction has been extracted by a first polarizer 12 from a light emitted from a broad band light source 11, this extracted linearly polarized beam is incident to one end of a measured object 1.

Then, from a light emitted from the other end side of the measured object 1, a linearly polarized beam in the same polarization direction as that of the light from the first polarizer 12 is extracted by a second polarizer 13, and thereafter, this extracted linearly polarized beam is incident to an optical spectrum analyzer 14.

In this case, a polarization direction of the linearly polarized beam incident to the measured object 1 is set to have an angle of 45 degrees with respect to the X axis (or the Y axis) by the first polarizer 12, when the incident surface of the measured object 1 is the XY plane.

Further, the second polarizer 13 is also matched with the direction of this first polarizer 12.

The transmission speed of an X-axis component and the transmission speed of a Y-axis component of the linearly polarized beam that has been incident to the measured object 1 do not become the same, due to a difference between the refractive index of a portion of the measured object 1 that follows the X-axis and the refractive index of a portion that follows the Y-axis.

For example, as shown in FIG. 7A, assume that a linearly polarized beam of a certain wavelength $\lambda$a is incident to the measured object 1, and its Y-axis component is delayed (or advanced) by 2$\pi$ from the X-axis component. Then, the polarization direction of the wavelength $\lambda$a emitted from the measured object 1 becomes the same as the incident status.

Accordingly, the light of this wavelength $\lambda$a is transmitted through the second polarizer 13 with a small loss.

Further, as shown in FIG. 7B, assume that a linearly polarized beam of a certain wavelength $\lambda$b is incident to the measured object 1, and its Y-axis component is delayed (or advanced) by $\pi$ from the X-axis component. Then, the polarization direction of the wavelength $\lambda$b emitted from the measured object 1 becomes orthogonal with the polarization direction extracted by the second polarizer 13.

Accordingly, the light of this wavelength $\lambda$a is attenuated large by the second polarizer 13 and cannot substantially be transmitted through.

This phenomenon occurs due to a difference in the delay time attributable to a difference between the refractive indexes of the measured object in the X-axis direction and Y-axis direction.

Further, as this delay time difference has continuity in the wavelength of a transmitted light, the intensity of the light transmitted through the second polarizer 13 changes in a constant period with respect to a change in the wavelength.

As a result, the optical spectrum analyzer 14 displays a spectrum waveform of which level changes periodically, as shown in FIG. 8.

Then, according to this fixed analyzer method, a differential group delay time that shows a level of PMD (this is called a PMD value) is calculated by the following equation, using a first peak wavelength $\lambda$1 and a last peak wavelength $\lambda$2, based on the assumption that a wavelength distance between adjacent peaks (or between adjacent bottoms) of this spectrum waveform is expressed as a phase difference 2$\pi$:

$$\Delta\tau = k(n-1)\cdot\lambda1\cdot\lambda2/(C\cdot\Delta\lambda)$$

where, k represents a mode coupling coefficient, C represents an optical speed, n represents a number of peaks, and $\Delta\lambda = \lambda2 - \lambda1$.

The mode coupling coefficient k is a value equal to or lower than 1 that is determined according to an inter-mode coupling status between the X-axis component and the Y-axis component of the light transmitted through the measured object 1. When the optical path length is not very long, it is possible to set k=1.

However, according to the above-described conventional PMD measuring system, based on the principle of measurement, it is not possible to calculate a PMD value, when at least two peaks do not exist in the spectrum displayed in the optical spectrum analyzer 14.

In other words, in the above-described equation for calculating a PMD value, it is a measurement limit of a PMD value when Δλ is a maximum at the time of n=2, that is, up to when two peaks (or bottoms) exist within a bandwidth of a broad band light source.

Therefore, according to the above-described conventional PMD measuring system, the measurement limit of a PMD value is controlled by the bandwidth of the broad band light source.

Actually, a bandwidth (half-value width) that can be used in the fixed analyzer method is up to about 200 nm, and a measurement limit of a PMD in the 1500 nm band becomes $\Delta\tau = 50 \times 10^{-12}$ (second).

Therefore, in order to obtain a PMD value equal to or smaller than this by using the fixed analyzer method, there is a problem that it is necessary to use other methods having complex structures (the polarization analysis method in a frequency region, and the interference method in a time region).

DISCLOSURE OF INVENTION

An object of the present invention is to provide a polarization mode dispersion measuring method and a polarization mode dispersion measuring system capable of obtaining a PMD value up to a smaller measurement limit, in a simple structure according to the fixed analyzer method, by solving the above conventional problems.

In order to achieve the above object, according to the present invention,
(1) there is provided a polarization mode dispersion measuring method comprising the steps of:
applying a polarization mode dispersion to a linearly polarized beam extracted from a light having a substantially uniform spectrum, with a reference object having a predetermined polarization mode dispersion value;
making the light applied with the predetermined polarization mode dispersion value incident to one end side of a measured object while rotating a polarization plane of the light, and detecting at least one of a maximum value and a minimum value of a polarization mode dispersion value generated from a spectrum of a linearly polarized beam emitted from the other side of the measured object following the rotation of the polarization plane of the light; and
calculating a polarization mode dispersion value of the measured object by using any two values among the predetermined polarization mode dispersion value, the maximum value of the polarization mode dispersion value, and the minimum value of the polarization mode dispersion value.

Further, in order to achieve the above object, according to the present invention,
(2) there is provided a polarization mode dispersion measuring method described in (1), wherein
the step of detecting at least one of a maximum value and a minimum value of the polarization mode dispersion value detects the two of the maximum value and the minimum value of the polarization mode dispersion value, and
the step of calculating a polarization mode dispersion value of the measured object calculates the value of the polarization mode dispersion of the measured object, based on a difference between the maximum value of the polarization mode dispersion value and the minimum value of the polarization mode dispersion value.

Further, in order to achieve the above object, according to the present invention,
(3) there is provided a polarization mode dispersion measuring method described in (1), wherein
the step of detecting at least one of a maximum value and a minimum value of the polarization mode dispersion value detects the maximum value of the polarization mode dispersion value, and
the step of calculating a polarization mode dispersion value of the measured object calculates the value of the polarization mode dispersion of the measured object, based on a difference between the maximum value of the polarization mode dispersion value and the predetermined polarization mode dispersion value.

Further, in order to achieve the above object, according to the present invention,
(4) there is provided a polarization mode dispersion measuring method described in (1), wherein
the step of detecting at least one of a maximum value and a minimum value of the polarization mode dispersion value calculates the minimum value of the polarization mode dispersion value, and
the step of calculating a polarization mode dispersion value of the measured object calculates the value of the polarization mode dispersion of the measured object, based on a difference between the minimum value of the polarization mode dispersion value and the predetermined polarization mode dispersion value.

Further, in order to achieve the above object, according to the present invention,
(5) there is provided a polarization mode dispersion measuring system comprising:
a light source (21) for emitting a light having substantially uniform spectrum;
a first polarizer (22) for extracting a linearly polarized beam from the light emitted from the light source;
a reference object (23) having a predetermined polarization mode dispersion value, for emitting a polarization mode dispersion to the linearly polarized beam incident to one end side and extracted by the first polarizer, and emitting a light from the other end side;
a polarization plane rotor (24) for rotating a polarization plane of the light emitted from the reference object, and making the light incident to one end side of a measured object;
a second polarizer (25) for extracting a linearly polarized beam from a light emitted from the other end side of the measured object; and
an optical spectrum analyzer (26) for detecting a spectrum of a light emitted from the second polarizer, wherein
at least one of a maximum value and a minimum value of a polarization mode dispersion value generated following the rotation of the polarization plane of the light is obtained, from the spectrum of the linearly polarized beam emitted from the other end side at one end side of the measured object detected by the optical spectrum analyzer, and
the polarization mode dispersion value of the measured object is obtained by using optional two values among the predetermined polarization mode dispersion value, the maximum value of the polarization mode dispersion value, and the minimum value of the polarization mode dispersion value.

Further, in order to achieve the above object, according to the present invention, (6) there is provided a polarization mode dispersion measuring system described in (5), wherein
both the maximum value and the minimum value of the polarization mode dispersion value generated following the rotation of the polarization plane of the light are obtained, from the spectrum of the linearly polarized beam emitted from the other end side at one end side of the measured object detected by the optical spectrum analyzer, and
the value of the polarization mode dispersion of the measured object is obtained based on a difference between the maximum value of the polarization mode dispersion value and the minimum value of the polarization mode dispersion value.

Further, in order to achieve the above object, according to the present invention, (7) there is provided a polarization mode dispersion measuring system described in (5), wherein
the maximum value of the polarization mode dispersion value generated following the rotation of the polarization plane of the light is obtained, from the spectrum of the linearly polarized beam emitted from the other end side at one end side of the measured object detected by the optical spectrum analyzer, and
the value of the polarization mode dispersion of the measured object is obtained based on a difference between the maximum value of the polarization mode dispersion value and the predetermined polarization mode dispersion value.

Further, in order to achieve the above object, according to the present invention, (8) there is provided a polarization mode dispersion measuring system described in (5), wherein
the minimum value of the polarization mode dispersion value generated following the rotation of the polarization plane of the light is obtained, from the spectrum of the linearly polarized beam emitted from the other end side at one end side of the measured object detected by the optical spectrum analyzer, and
the value of the polarization mode dispersion of the measured object is obtained based on a difference between the minimum value of the polarization mode dispersion value and the predetermined polarization mode dispersion value.

Further, in order to achieve the above object, according to the present invention, (9) there is provided a polarization mode dispersion measuring system comprising:
a light source (21) for emitting a light having substantially uniform spectrum;
a first polarizer (22) for extracting a linearly polarized beam from the light emitted from the light source;
a reference object (23) having a predetermined polarization mode dispersion value, for emitting a polarization mode dispersion to the linearly polarized beam incident to one end side and extracted by the first polarizer, and emitting a light from the other end side;
a polarization plane rotor (24) for rotating a polarization plane of the light emitted from the reference object, and making the light incident to one end side of a measured object;

a second polarizer (25) for extracting a linearly polarized beam from a light emitted from the other end side of the measured object;
spectrum detecting means (30) for receiving the light extracted by the second polarizer, automatically analyzing the spectrum of the light, and detecting a wavelength distance between adjacent peaks (or between adjacent bottoms) of the spectrum, a first peak wavelength λ1, and a last peak wavelength λ2; and
PMD calculating means (31) for calculating a PMD value P (a differential group delay time Δτ) by automatically calculating the following expression from values detected by the spectrum detecting means:

$$P = k(n-1) \cdot \lambda 1 \cdot \lambda 2 / (C \cdot \Delta\lambda)$$

where, k represents a mode coupling coefficient, C represents an optical speed, n represents a number of peaks, and Δλ=λ2−λ1.

BEST MODE OF CARRYING OUT OF THE INVENTION

Embodiments of the present invention will be explained below using the drawings.

First Embodiment

Figure 1:
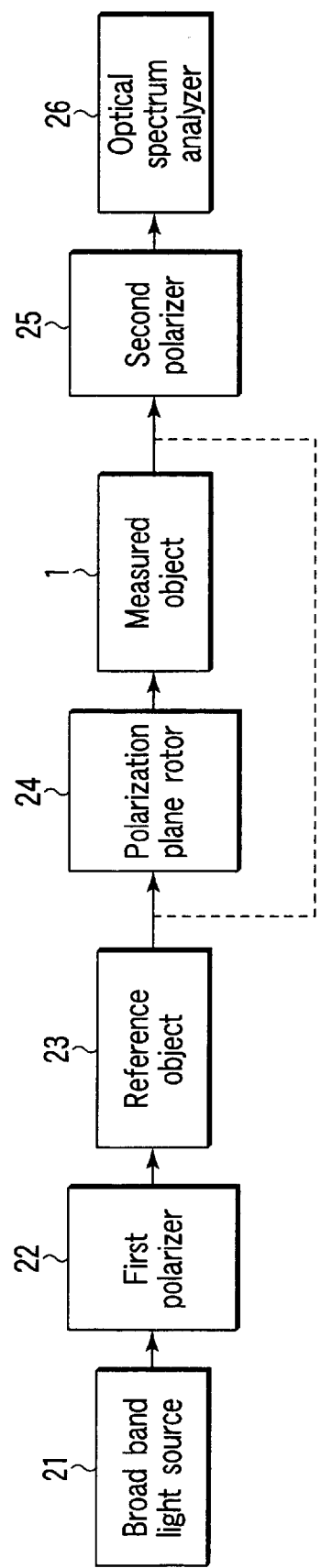
FIG. 1 is a block diagram that explains a structure of a polarization mode dispersion measuring method and a polarization mode dispersion measuring system according to a first embodiment of the present invention.

FIG. 1 is a block diagram that explains a polarization mode dispersion measuring method and a structure of a polarization mode dispersion measuring system for executing this method according to a first embodiment of the present invention.

In FIG. 1, a broad band light source 21 is constructed of a white-color lamp, an SLD (super-luminescence diode) and the like, and has a substantially uniform spectrum in a wavelength area of a light handled by a measured object 1.

A light emitted from this broad band light source 21 is incident to a first polarizer 22.

This first polarizer 22 extracts a linearly polarized beam having a constant polarization direction from the light emitted from the broad band light source 21, and makes the extracted linearly polarized beam incident to one side of a reference object 23.

The reference object 23 has a PMD value (a differential group delay time) larger than the measured object 1, and for example, an optical fiber (called a PANDA fiber) having a predetermined length manufactured to have an intentionally large difference in refractive indexes due to polarization directions is used.

On the other end side of this reference object 23, a polarization plane rotor 24 is provided.

This polarization plane rotor 24 rotates a polarization plane of a light emitted from the reference object 23 by an optional angle, and makes the light of which polarization plane has been rotated incident to one end side of the measured object 1.

A light emitted from the other end side of this measured object 1 is made incident to a second polarizer 25.

This second polarizer 25 extracts a linearly polarized beam having a constant polarization direction from the light emitted from the measured object 1, and outputs this light to an optical spectrum analyzer 26.

This optical spectrum analyzer 26 displays a spectrum of the light emitted from the second polarizer 25 on a screen.

Then, in this measuring system, as described previously, a PMD value P (a differential group delay time $\Delta\tau$) is calculated by the following equation (1), using a first peak wavelength $\lambda 1$ and a last peak wavelength $\lambda 2$, based on the assumption that a wavelength distance between adjacent peaks (or between adjacent bottoms) of this spectrum waveform shown in the optical spectrum analyzer 26 is expressed as a phase difference $2\pi$:

$$P=k(n-1)\cdot\lambda 1\cdot\lambda 2/(C\cdot\Delta\lambda) \quad (1)$$

where, k represents a mode coupling coefficient, C represents an optical speed, n represents a number of peaks, and $\Delta\lambda=\lambda 2-\lambda 1$.

The mode coupling coefficient k is a value equal to or lower than 1 that is determined according to an inter-mode coupling status between the X-axis component and the Y-axis component of the light transmitted through the measured object 1. When the optical path length is not very long, it is possible to set as k=1.

As explained above, according to the system having the reference object 23 and the polarization plane rotor 24 inserted into between the first polarizer 22 and the one end side of the measured object 1, a polarization mode dispersion larger than the PMD value of the measured object 1 is applied to the linearly polarized beam extracted by the first polarizer 22.

Then, the polarization plane of the light applied with this polarization mode dispersion is rotated by the polarization plane rotor 24, and the light of which polarization plane has been rotated is made incident to the measured object 1.

Therefore, the polarization direction of the light incident to the measured object 1 changes based on the rotation of the polarization plane effected by the polarization plane rotor 24, and the spectrum displayed on the optical spectrum analyzer 26 also changes accordingly.

Then, the PMD value calculated based on the spectrum displayed on the optical spectrum analyzer 26 also changes.

In this case, assume that the PMD value of the polarization plane rotor 24 is negligibly small. Then, when the rotation angle of the polarization plane rotor 24 has been set such that the direction of a change in the phase of the light due to the reference object 23 and a direction of a change in the phase due to the measured object 1 coincide with each other, the PMD value obtained from the spectrum displayed on the optical spectrum analyzer 26 becomes a maximum Pmax.

This maximum PMD value corresponds to a sum of the PMD value of the reference object 23 and the PMD value of the measured object 1.

This maximum value Pmax is obtained by obtaining $\lambda 1$, $\lambda 2$, n, and $\Delta\lambda$ from the spectrum distribution displayed on the optical spectrum analyzer when the above conditions have been set, and by substituting these values and a known optical speed C into the above equation (1).

Further, in obtaining $\lambda 1$ and $\lambda 2$, it has been structured such that a user attaches a marker to two adjacent peak values so that the wavelength at this time is counted and this value is output.

Further, when the rotation angle of the polarization plane rotor 24 has been set such that the direction of a change in the phase of the light due to the reference object 23 and a direction of a change in the phase due to the measured object 1 become opposite from each other, the PMD value obtained from the spectrum displayed on the optical spectrum analyzer 26 becomes a minimum Pmin.

This minimum PMD value corresponds to a value obtained by subtracting the PMD value of the measured object 1 from the PMD value of the reference object 23.

This minimum value Pmin is obtained by obtaining $\lambda 1$, $\lambda 2$, n, and $\Delta\lambda$ from the spectrum distribution displayed on the optical spectrum analyzer when the above conditions have been set, and by substituting these values and a known optical speed C into the above equation (1).

Therefore, when the maximum PMD value or the minimum PMD value is obtained by rotating the polarization plane rotor 24, it is possible to obtain the PMD value of the measured object 1.

Namely, the PMD value of the reference object 23 is expressed as Pr, the PMD value of the measured object 1 is expressed as Px, and the maximum PMD value obtained by rotating the polarization plane rotor 24 is expressed as Pmax. Then, $$Pmax=Pr+Px$$

is obtained, and when the PMD value Pr of the reference object 23 has already been known, it is possible to obtain the PMD value Px of the measured object 1 by calculating $$Px=Pmax-Pr \quad (2).$$

Figure 2:
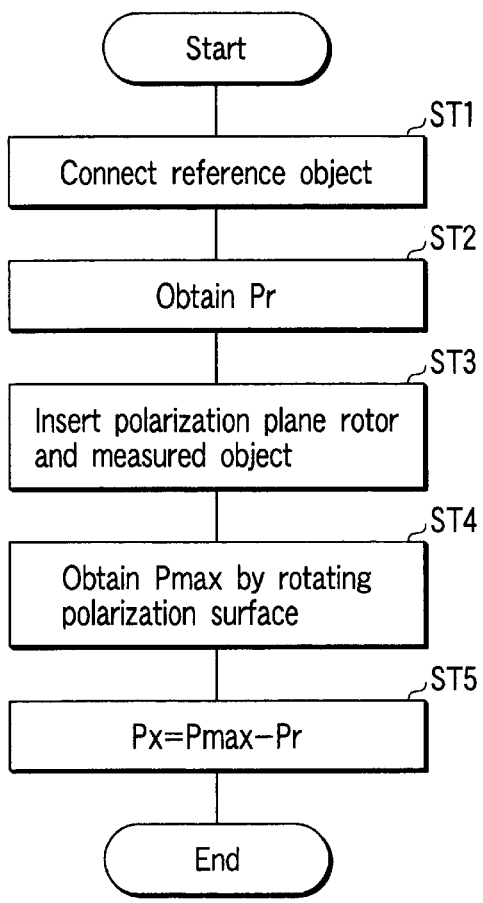
FIG. 2 is a flowchart that explains the operation of the polarization mode dispersion measuring method and the polarization mode dispersion measuring system according to the first embodiment of the present invention.

In this case, as shown in a flowchart of FIG. 2, first, the PMD value Pr of the reference object 23 is obtained, by connecting the reference object 23 to between the first polarizer 22 and the second polarizer 25 (steps ST1, ST2).

Next, the maximum PMD value Pmax is obtained, by inserting the polarization plane rotor 24 and the measured object 1 into between the reference object 23 and the second polarizer 25, and by rotating the polarization plane rotor 24 (steps ST3, ST4).

Next, the PMD value Px of the measured object 1 is obtained, by calculating the difference of the above equation (2) (steps ST3, ST4).

Further, Pmin=Pr−Px, when the minimum PMD value obtained by rotating the polarization plane rotor 24 is expressed as Pmin, and when the PMD value Pr of the reference object 23 has already been known, it is possible to obtain the PMD value Px of the measured object 1, by calculating $$Px=Pr-Pmin \qquad (3).$$

Figure 3:
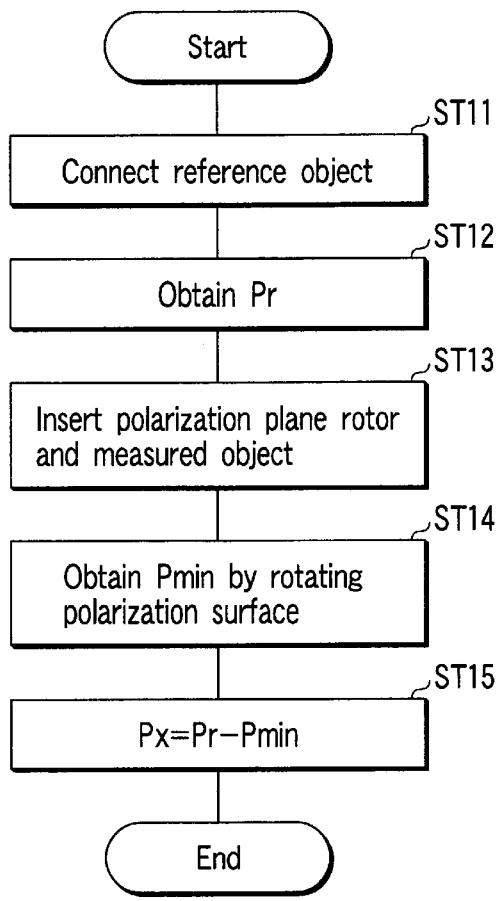
FIG. 3 is a flowchart that explains the operation of the polarization mode dispersion measuring method and the polarization mode dispersion measuring system according to the first embodiment of the present invention.

In this case, as shown in a flowchart in FIG. 3, first, the PMD value Pr of the reference object 23 is obtained, by connecting the reference object 23 to between the first polarizer 22 and the second polarizer 25 (steps ST11, ST12).

Next, the minimum PMD value Pmin is obtained by inserting the polarization plane rotor 24 and the measured object 1 into between the reference object 23 and the second polarizer 25, and by rotating the polarization plane rotor 24 (steps ST13, ST14).

Next, the PMD value Px of the measured object 1 is obtained by calculating the difference of the above equation (3).

Further, from the above equations (2) and (3), $$Pmax-Pmin=2Px,$$

and, therefore, it is possible to obtain the PMD value Px of the measured object 1, by calculating $$Px=(Pmax-Pmin)/2 \qquad (4).$$

Figure 4:
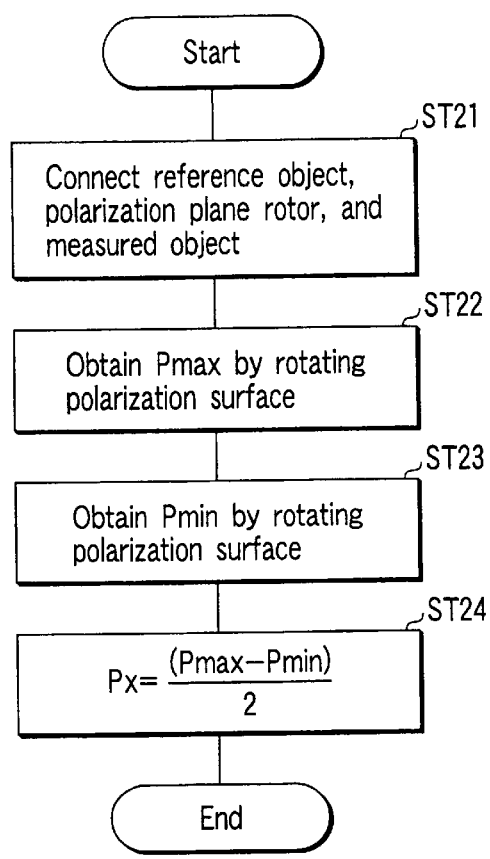
FIG. 4 is a flowchart that explains the operation of the polarization mode dispersion measuring method and the polarization mode dispersion measuring system according to the first embodiment of the present invention.
Figure 8:
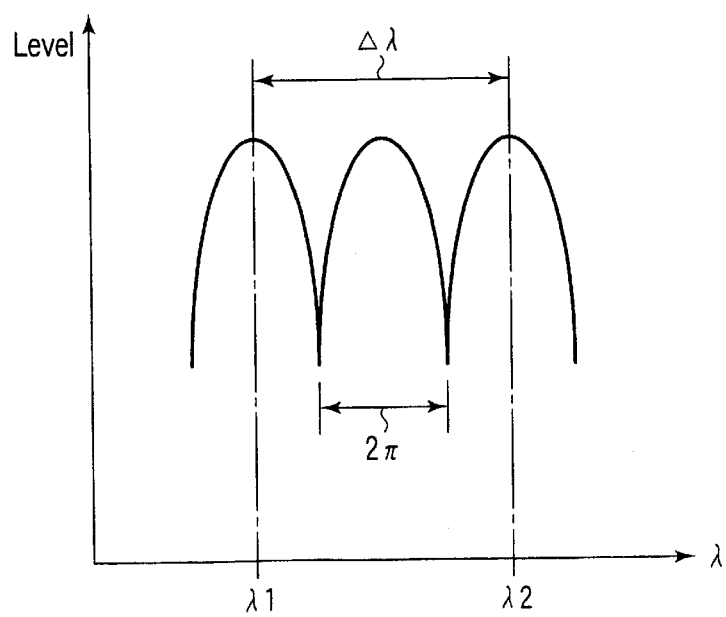
FIG. 8 is a diagram showing one example of a spectrum waveform for explaining the operation of the conventional fixed analyzer method.

In this case, as shown in a flowchart in FIG. 4, first, the reference object 23, the polarization plane rotor 24 and the measured object 1 are connected to between the first polarizer 22 and the second polarizer 25 (step ST21).

Next, the maximum PMD value Pmax and the minimum PMD value Pmin are obtained by rotating the polarization plane rotor 24 (steps ST22, ST23).

Next, the PMD value Px of the measured object 1 is obtained by calculating the above equation (4) (step ST24).

According to this method, as it is not necessary to obtain the PMD value Pr of the reference object 23, it is possible to obtain the PMD value Px of the measured object 1 by simpler processing.

A theoretical measurement limit of the PMD value Px of the measured object 1 according to the above measuring method becomes limitless, based on the condition that it is smaller than the PMD value Pr of the reference object 23.

In other words, a lower limit L of the PMD value that can be obtained from the spectrum of the optical spectrum analyzer 26 in this system is about $50 \times 10^{-12}$ (second) as described above. Therefore, the minimum PMD value Pmin that can be obtained by the measurement is a value equal to or more than this lower limit L.

However, as this minimum PMD value Pmin is equal to Pr−Px, it is necessary that Pr−Px becomes equal to or more than the lower limit L.

This condition does not limit the lower value of the PMD value Px of the measured object 1.

For example, even when the PMD value Px is $5 \times 10^{-12}$ (second) smaller than the lower limit L, the PMD value Pmin becomes equal to or more than the lower limit value L, when the PMD value Pr of the reference object 23 is larger than $55 \times 10^{-12}$ (second).

Accordingly, there is no theoretical measurement limit of the PMD value Px of the measured object 1, and it is possible to measure accurately the measured object 1 of the PMD value smaller than the measurement limit L of the conventional measuring system.

As explained above, according to the polarization mode dispersion measuring method of the present embodiment, a polarization mode dispersion larger than a value of the polarization mode dispersion of the measured object 1 is applied to a linearly polarized beam extracted from the broad band light; the light applied with this polarization mode dispersion is incident to one end side of the measured object 1 while rotating the polarization plane of this light, and a value of the polarization mode dispersion is obtained from the spectrum of the linearly polarized beam included in the light emitted from the other end side of the measured object 1; and ½ of a difference between the maximum polarization mode dispersion value Pmax and the minimum polarization mode dispersion value Pmin obtained by rotating the polarization plane, or a difference between the maximum polarization mode dispersion value Pmax and the polarization mode dispersion value Pr of the reference object 23, or a difference between the minimum polarization mode dispersion value Pmin and the polarization mode dispersion value Pr of the reference object 23, is calculated as the polarization mode dispersion value Px of the measured object 1.

Therefore, according to the polarization mode dispersion measuring method of the present embodiment, it is possible to accurately measure the measured object 1 of a PMD value substantially smaller than the measurement limit of the conventional system.

Further, according to the polarization mode dispersion measuring system of the present embodiment, in the polarization mode dispersion measuring system that makes a linearly polarized beam extracted by the first polarizer 22 from a light emitted from the broad band light source 21 incident to one end side of the measured object 1, detects by the optical spectrum analyzer 26 the spectrum of the linearly polarized beam extracted by the second polarizer 25 from the light emitted from the other end side of the measured object 1, and obtains a value of the polarization mode dispersion of the measured object 1 based on the detected spectrum, there are provided the reference object 23 that has a polarization mode dispersion value larger than the polarization mode dispersion value of the measured object 1, between the first polarizer 22 and the one end side of the measured object 1, receives at one end side the linearly polarized beam extracted by the first polarizer 22, and emits the linearly polarized beam from the other end side, and the polarization plane rotor 24 that optionally rotates the polarization plane of the light emitted from the reference object 23, and makes this light incident to the one end side of the measured object 1.

Therefore, according to the polarization mode dispersion measuring system of the present embodiment, it is possible to obtain with the polarization plane rotor 24 the maximum PMD value that corresponds to a sum of the PMD value of the reference object 23 and the PMD value of the measured object 1, and the minimum PMD value that corresponds to a value obtained by subtracting the PMD value of the measured object 1 from the PMD value of the reference object 23, and from these values, it is possible to accurately obtain a PMD value of the measured object 1 even when this PMD value is a small value.

Second Embodiment

In the above first embodiment, a light extracted from the second polarizer 25 is input to the optical spectrum analyzer 26, and a PMD value is obtained artificially from this display spectrum.

Figures 5, 6:
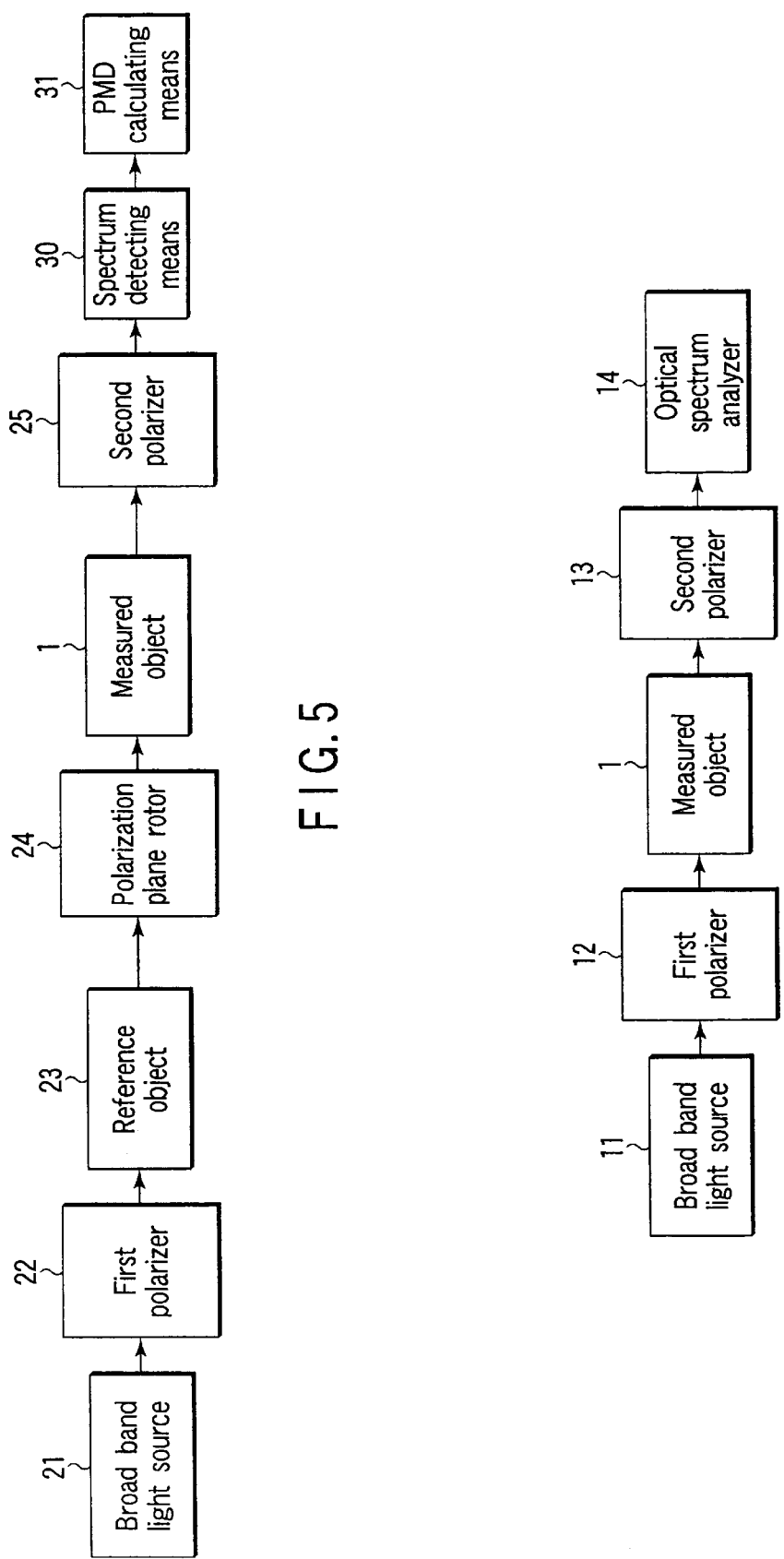
FIG. 5 is a block diagram that explains a structure of a case where the calculation of a PMD is automated, as a polarization mode dispersion measuring method and a polarization mode dispersion measuring system according to a second embodiment of the present invention.
FIG. 6 is a block diagram that explains a structure of a conventional measuring system for measuring a polarization mode dispersion by using a fixed analyzer method.
Figure 7A:
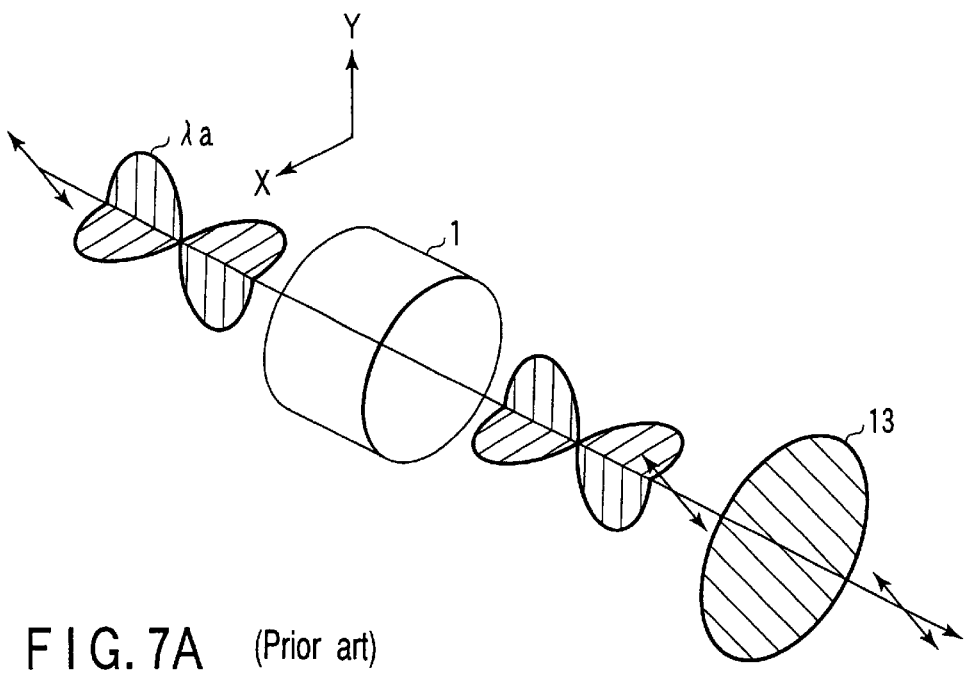
FIGS. 7A and B are diagrams showing a status of propagation of a light based on a difference of refractive indexes, for explaining the operation of the conventional fixed analyzer method, respectively.
Figure 7B:
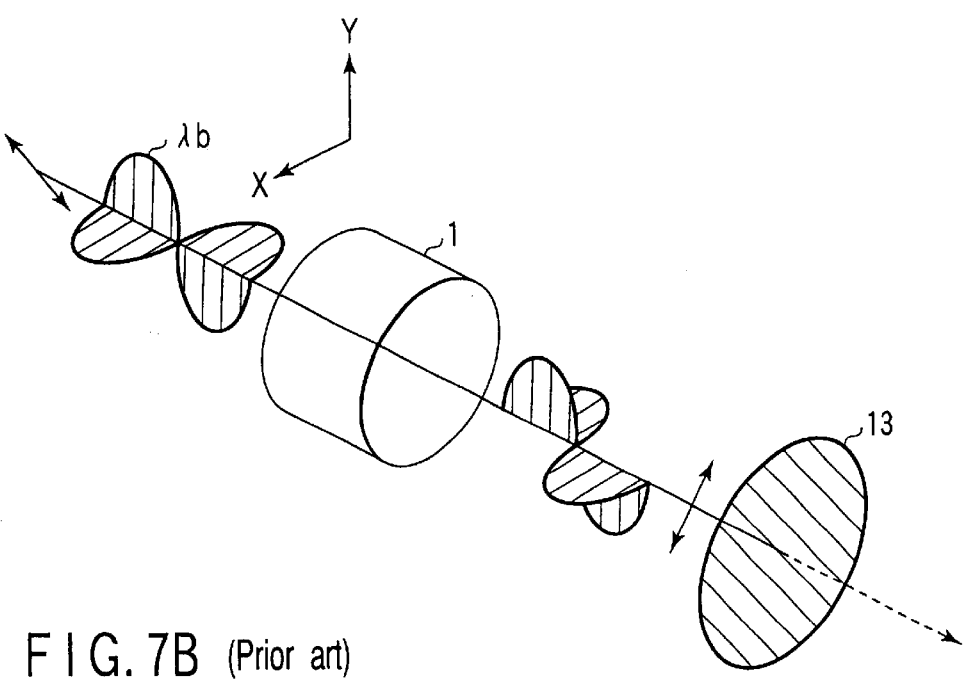

On the other hand, according to this second embodiment, a PMD value is obtained automatically, from a polarization mode dispersion measuring system shown in FIG. 5.

In other words, in the polarization mode dispersion measuring system according to the second embodiment shown in FIG. 5, spectrum detecting means 30 and PMD calculating means 31 are provided, in place of the optical spectrum analyzer 26 of the first embodiment.

In this case, the spectrum detecting means 30 is provided to receive a light extracted from the second polarizer 25, automatically analyze the spectrum of this light, and detect a wavelength distance between adjacent peaks (or between adjacent bottoms) of the spectrum, and a first peak wavelength λ1 and a last peak wavelength λ2.

Further, the PMD calculating means 31 is provided to automatically calculate the following expression to calculate the PMD value, from the value detected by the spectrum detecting means 30:

$$P=k(n-1)\cdot \lambda 1\cdot \lambda 2/(C\cdot \Delta \lambda).$$

With this arrangement, according to this second embodiment, as the PMD value can be obtained automatically, it is possible to carry out the measurement efficiently.

As explained above, according to the polarization mode dispersion measuring method of the present invention, a polarization mode dispersion larger than a value of the polarization mode dispersion of the measured object is applied to a linearly polarized beam extracted from the broad band light; the light applied with this polarization mode dispersion is incident to one end side of the measured object while rotating the polarization plane of this light, and a value of the polarization mode dispersion is obtained from the spectrum of the linearly polarized beam included in the light emitted from the other end side of the measured object; and a value based on a difference between the maximum polarization mode dispersion value and the minimum polarization mode dispersion value obtained by rotating the polarization plane, or a difference between the maximum polarization mode dispersion value and the polarization mode dispersion value of the reference object, or a difference between the minimum polarization mode dispersion value and the polarization mode dispersion value of the reference object, is calculated as the polarization mode dispersion value of the measured object.

Consequently, according to the polarization mode dispersion measuring system of the present invention, it is possible to measure accurately the value of the polarization mode dispersion of the measured object up to a substantially smaller value than the measurement limit of the conventional system.

Further, according to the polarization mode dispersion measuring system of the present invention, in the polarization mode dispersion measuring system that makes a linearly polarized beam extracted by the first polarizer from a light emitted from the broad band light source incident to one end side of the measured object, detects by the optical spectrum analyzer the spectrum of the linearly polarized beam extracted by the second polarizer from the light emitted from the other end side of the measured object, and obtains a value of the polarization mode dispersion of the measured object based on the detected spectrum, there are provided the reference object that has a polarization mode dispersion value larger than that of the measured object, between the first polarizer and the one end side of the measured object, receives at one end side the linearly polarized beam extracted by the first polarizer, and emits the linearly polarized beam from the other end side, and the polarization plane rotor that optionally rotates the polarization plane of the light emitted from the reference object, and makes this light incident to the one end side of the measured object.

Consequently, according to the polarization mode dispersion measuring system of the present invention, it is possible to obtain with the polarization plane rotor the maximum polarization mode dispersion value that corresponds to a sum of the polarization mode dispersion value of the reference object and the polarization mode dispersion value of the measured object, and the minimum polarization mode dispersion value that corresponds to a value obtained by subtracting the polarization mode dispersion value of the measured object from the polarization mode dispersion value of the reference object, and from these values, it is possible to accurately measure a polarization mode dispersion value of the measured object up to a value substantially smaller than the measurement limit of the conventional system.

Therefore, according to the present invention, it is possible to provide a polarization mode dispersion measuring method and a polarization mode dispersion measuring system, capable of obtaining a PMD value up to a smaller measurement limit, in a simple structure according to the fixed analyzer method, by solving the conventional problems.

What is claimed is:

1. A polarization mode dispersion measuring method comprising the steps of:

applying a polarization mode dispersion to a linearly polarized beam extracted from a light having substantially uniform spectrum, with a reference object having a predetermined polarization mode dispersion value;

making the light applied with the predetermined polarization mode dispersion value incident to one end side of a measured object while rotating a polarization plane of the light, and detecting at least one of a maximum value and a minimum value of a polarization mode dispersion value generated from a spectrum of a linearly polarized beam emitted from the other side of the measured object following the rotation of the polarization plane of the light; and calculating a polarization mode dispersion value of the measured object by using any two values among the predetermined polarization mode dispersion value, the maximum value of the polarization mode dispersion value, and the minimum value of the polarization mode dispersion value.

2. The polarization mode dispersion measuring method according to claim 1, wherein the step of detecting at least one of a maximum value and a minimum value of the polarization mode dispersion value detects the two of the maximum value and the minimum value of the polarization mode dispersion value, and the step of calculating a polarization mode dispersion value of the measured object calculates the value of the polarization mode dispersion of the measured object, based on a difference between the maximum value of the polarization mode dispersion value and the minimum value of the polarization mode dispersion value.

3. The polarization mode dispersion measuring method according to claim 1, wherein the step of detecting at least one of a maximum value and a minimum value of the polarization mode dispersion value detects the maximum value of the polarization mode dispersion value, and the step of calculating a polarization mode dispersion value of the measured object calculates the value of the polarization mode dispersion of the measured object, based on a difference between the maximum value of the polarization mode dispersion value and the predetermined polarization mode dispersion value.

4. The polarization mode dispersion measuring method according to claim 1, wherein the step of detecting at least one of a maximum value and a minimum value of the polarization mode dispersion value detects the minimum value of the polarization mode dispersion value, and the step of calculating a polarization mode dispersion value of the measured object calculates the value of the polarization mode dispersion of the measured object, based on a difference between the minimum value of the polarization mode dispersion value and the predetermined polarization mode dispersion value.

5. A polarization mode dispersion measuring system comprising:

a light source for emitting a light having substantially uniform spectrum;

a first polarizer for extracting a linearly polarized beam from the light emitted from the light source;

a reference object having a predetermined polarization mode dispersion value, for emitting a polarization mode dispersion to the linearly polarized beam incident to one end side and extracted by the first polarizer, and emitting a light from the other end side;

a polarization plane rotor for rotating a polarization plane of the light emitted from the reference object, and making the light incident to one end side of a measured object;

a second polarizer for extracting a linearly polarized beam from a light emitted from the other end side of the measured object; and an optical spectrum analyzer for detecting a spectrum of a light emitted from the second polarizer, wherein at least one of a maximum value and a minimum value of a polarization mode dispersion value generated following the rotation of the polarization plane of the light is obtained, from the spectrum of the linearly polarized beam emitted from the other end side at one end side of the measured object detected by the optical spectrum analyzer, and the polarization mode dispersion value of the measured object is obtained by using optional two values among the predetermined polarization mode dispersion value, the maximum value of the polarization mode dispersion value, and the minimum value of the polarization mode dispersion value.

6. The polarization mode dispersion measuring system according to claim 5, wherein both the maximum value and the minimum value of the polarization mode dispersion value generated following the rotation of the polarization plane of the light are obtained, from the spectrum of the linearly polarized beam emitted from the other end side at one end side of the measured object detected by the optical spectrum analyzer, and the value of the polarization mode dispersion of the measured object is obtained based on a difference between the maximum value of the polarization mode dispersion value and the minimum value of the polarization mode dispersion value.

7. The polarization mode dispersion measuring system according to claim 5, wherein the maximum value of the polarization mode dispersion value generated following the rotation of the polarization plane of the light is obtained, from the spectrum of the linearly polarized beam emitted from the other end side at one end side of the measured object detected by the optical spectrum analyzer, and the value of the polarization mode dispersion of the measured object is obtained based on a difference between the maximum value of the polarization mode dispersion value and the predetermined polarization mode dispersion value.

8. The polarization mode dispersion measuring system according to claim 5, wherein the minimum value of the polarization mode dispersion value generated following the rotation of the polarization plane of the light is obtained, from the spectrum of the linearly polarized beam emitted from the other end side at one end side of the measured object detected by the optical spectrum analyzer, and the value of the polarization mode dispersion of the measured object is obtained based on a difference between the minimum value of the polarization mode dispersion value and the predetermined polarization mode dispersion value.

9. A polarization mode dispersion measuring system comprising:

a light source for emitting a light having substantially uniform spectrum;

a first polarizer for extracting a linearly polarized beam from the light emitted from the light source;

a reference object having a predetermined polarization mode dispersion value, for emitting a polarization mode dispersion to the linearly polarized beam incident to one end side and extracted by the first polarizer, and emitting a light from the other end side;

a polarization plane rotor for rotating a polarization plane of the light emitted from the reference object, and making the light incident to one end side of a measured object;

a second polarizer for extracting a linearly polarized beam from a light emitted from the other end side of the measured object;

spectrum detecting means for receiving the light extracted by the second polarizer, automatically analyzing the spectrum of the light, and detecting a wavelength distance between adjacent peaks (or between adjacent bottoms) of the spectrum, a first peak wavelength $\lambda 1$, and a last peak wavelength $\lambda 2$; and PMD calculating means for calculating a PMD value P (a differential group delay time $\Delta\tau$) by automatically calculating the following expression from values detected by the spectrum detecting means:

$$P=k(n-1)\cdot\lambda 1\cdot\lambda 2/(C\cdot\Delta\lambda)$$

where, k represents a mode coupling coefficient, C represents an optical speed, n represents a number of peaks, and $\Delta\lambda=\lambda 2-\lambda 1$.

* * * * *